United States Patent
Wormald et al.

(10) Patent No.: US 8,346,266 B2
(45) Date of Patent: Jan. 1, 2013

(54) AUTOMATIC OPERATION OF A WIRELESS DEVICE BASED ON PHYSICAL SPEED

(75) Inventors: Chris Wormald, Kitchener (CA); Russell N. Owen, Waterloo (CA)

(73) Assignee: Research In Motion Limited, Waterloo, Ontario (CA)

( * ) Notice: Subject to any disclaimer, the term of this patent is extended or adjusted under 35 U.S.C. 154(b) by 1284 days.

(21) Appl. No.: 11/552,802

(22) Filed: Oct. 25, 2006

(65) Prior Publication Data
US 2008/0099563 A1 May 1, 2008

(51) Int. Cl.
*H04W 36/24* (2009.01)
(52) U.S. Cl. .......... 455/441; 455/238.1; 455/456.4; 455/569.2; 455/575.9
(58) Field of Classification Search .......... 455/441, 455/238.1, 456.4, 569.2, 575.9, 567, 456.1–456.5, 455/550.1, 575.1, 67.11, 401, 412.1–413, 455/517, 440, 569.1
See application file for complete search history.

(56) References Cited

U.S. PATENT DOCUMENTS

| | | | |
|---|---|---|---|
| 6,311,078 B1 | 10/2001 | Hardouin | |
| 6,470,447 B1 * | 10/2002 | Lambert et al. | 713/151 |
| 6,496,703 B1 | 12/2002 | da Silva | |
| 6,640,115 B1 | 10/2003 | Fujimoto et al. | |
| 6,643,517 B1 | 11/2003 | Steer | |
| 6,728,542 B2 * | 4/2004 | Meda | 455/445 |
| 6,799,052 B2 | 9/2004 | Agness et al. | |
| 6,898,445 B2 * | 5/2005 | Slettengren et al. | 455/567 |
| 6,934,547 B2 * | 8/2005 | Suzuki | 455/441 |
| 7,242,940 B2 * | 7/2007 | Maruyama | 455/441 |
| 7,324,839 B2 * | 1/2008 | Kuroiwa | 455/567 |
| 7,369,845 B2 * | 5/2008 | Keohane et al. | 455/418 |
| 7,417,961 B2 * | 8/2008 | Lau | 370/310 |
| 7,477,187 B2 * | 1/2009 | Rofougaran | 342/357.32 |
| 7,505,784 B2 * | 3/2009 | Barbera | 455/557 |
| 7,590,405 B2 * | 9/2009 | Ewell, Jr. | 455/404.1 |
| 7,697,917 B2 * | 4/2010 | Camp et al. | 455/345 |
| 7,711,355 B1 * | 5/2010 | Kruger et al. | 455/417 |
| 2002/0198005 A1 | 12/2002 | Hilton et al. | |
| 2004/0110524 A1 * | 6/2004 | Takano et al. | 455/522 |
| 2004/0162109 A1 | 8/2004 | Shimoda et al. | |
| 2004/0203667 A1 | 10/2004 | Schroeder et al. | |
| 2006/0099940 A1 | 5/2006 | Pfleging et al. | |
| 2010/0216509 A1 * | 8/2010 | Riemer et al. | 455/557 |

FOREIGN PATENT DOCUMENTS

| | | |
|---|---|---|
| EP | 1 326 349 | 7/2003 |
| GB | 2 408 174 | 5/2005 |

OTHER PUBLICATIONS

Clark, Tom, "GPS Determination of Course and Speed", Retrieved from http://www.aprs.net/vm/gps_cs.htm on Jan. 16, 2007.

* cited by examiner

*Primary Examiner* — Pablo Tran

(57) ABSTRACT

A wireless device operates in an operating state determined as a function of the wireless device's physical speed. In some implementations, the wireless device determines the physical speed using a GPS (global positioning system). If the wireless device determines based on the physical position and/or physical speed that the user is driving an automobile in a region in which using a wireless device is not permitted while driving, then the wireless device automatically disables device features. However, if the user is actually a passenger, then the user may over-ride the automatic disabling of device features. In some implementations, the wireless device also informs other wireless users that communication is inappropriate or impossible. In some implementations, the wireless device also informs a communications node to process communications directed to the wireless device.

18 Claims, 8 Drawing Sheets

AUTOMATIC OPERATION OF A WIRELESS DEVICE BASED ON PHYSICAL SPEED

FIELD OF THE APPLICATION

The application relates to wireless communication, and more particularly to operation of wireless devices.

BACKGROUND

Wireless devices may provide users with a variety of communication abilities such as email and telephony. The ability to communicate using a wireless device while away from home or office has made wireless devices very convenient for users. However, in some instances, it may be inappropriate or unsafe to operate a wireless device. Mary users talk on their wireless device while driving, which can be a safety hazard because the user is distracted from their driving. A hands-free set is an existing solution that allows a driver to have both of their hands free for driving. However, this solution may require installation in a vehicle and can still distract a driver. Therefore, a hands-free set is not always an appropriate solution.

In addition to safety concerns associated with operating a wireless device while driving, there may be legal concerns. Some states and countries have specific laws with respect to using a wireless device while driving. A user may be unaware of these specific laws, especially if the user travels into another state or country. There may also be potential liability concerns if the user is conducting business while driving during company time and using company resources.

BRIEF DESCRIPTION OF THE DRAWINGS

Embodiments will now be described with reference to the attached drawings in which.

DETAILED DESCRIPTION OF THE PREFERRED EMBODIMENTS

Figure 1:
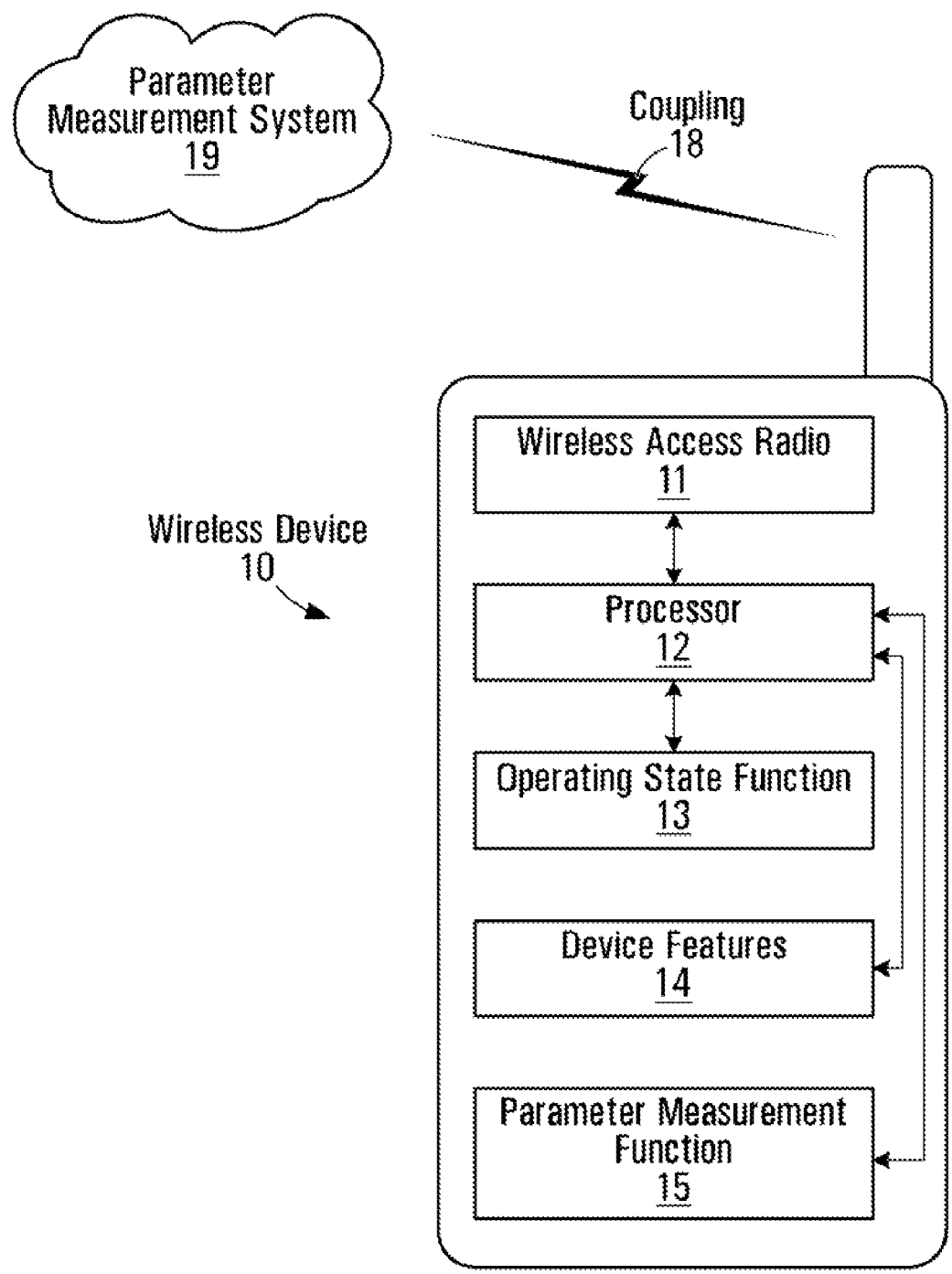
FIG. 1 is a schematic of an example wireless device coupled to a parameter measurement system.

According to a broad aspect, there is provided a method comprising: determining a physical speed of a wireless device; and allowing the wireless device to operate according to an operating state, the operating state being one of a plurality of possible operating states and being determined as a function of at least the physical speed.

In some embodiments, the method further comprises: communicating the operating state to the wireless device, the wireless device controlling operation of the wireless device in accordance with the operating state.

In some embodiments, the method further comprises at least one of: a) processing communications directed to the wireless device in accordance with the operating state of the wireless device; and b) disabling communications from the wireless device in accordance with the operating state of the wireless device.

In some embodiments, determining the physical speed comprises: acquiring two position measurements; and computing the physical speed of the wireless device as the difference between the two position measurements divided by a time interval between the two position measurements.

In some embodiments, the method further comprises: receiving information from an automobile, the automobile having a substantially identical physical speed as the wireless device, the information being used to determine the physical speed of the wireless device.

In some embodiments, the automobile communicates the physical speed to the wireless device via BT (BlueTooth, communication.

In some embodiments, the method further comprises: communicating to a communications node an indication to process communications directed at the wireless device at least until the operating state is changed.

In some embodiments, the status information comprises at least one of the operating state, an indication of whether the wireless device is able to process communications, physical position, and physical speed.

In some embodiments, the status information is associated with permissions so as to allow a set of wireless users to access the status information while disallowing all others from accessing the status information.

In some embodiments, the method further comprises: communicating permission information to the communications node, the permission information used by the communications node to determine permissions for the status information.

In some embodiments, the method further comprises: receiving information of physical position in respect of wireless coverage zones, the information being used to determine the physical position of the wireless device.

In some embodiments, the method further comprises: maintaining information useful for determining the operating state of the wireless device as a function of at least the physical speed and the physical position of the wireless device, the information being geographic-specific, determining the operating state based on at least the physical speed, the physical position, and the maintained information.

In some embodiments, the respective set of device features comprises at least one feature that would require attention by a user of the wireless device if the at least one feature was not disabled.

In some embodiments, the respective set of device features comprises at least one of telephony, direct dialing, telephony without a headset, Internet browsing, electronic messaging, voice call without a wired headset, voice call without a wireless headset, composing emails, reading emails, dialing a phone number using digit dial, dialing a phone number using voice activated dialing, dialing using speed dial, sending or receiving instant messages, typing notes in applications, using a mapping application, unlocking a device, and any feature using wireless communication.

According to another broad aspect, there is provided a wireless device comprising a wireless access radio adapted to communicate with a wireless network; a parameter measurement function adapted to determine a physical speed of the wireless device; an operating state function adapted to allow the wireless device to operate according to an operating state, the operating state being one of a plurality of possible operating states and being determined as a function of at least the physical speed.

According to another broad aspect, there is provided a communications node comprising an operating state function adapted to: determine a physical speed of a wireless device; and allow the wireless device to operate according to an operating state, the operating state being one of a plurality of possible operating states and being determined as a function of at least the physical speed.

According to another broad aspect, there is provided a method comprising: determining a physical position of a wireless device; automatically disabling a set of device features of the wireless device as a function of at least the physical position of the wireless device; and receiving user input from a user of the wireless device, the user input enabling at least one device feature of the set of device features that has been automatically disabled.

According to another broad aspect, there is provided a wireless device comprising: a wireless access radio adapted to communicate with a wireless network; a parameter measurement function adapted to determine a physical position of the wireless device; an operating state function adapted to automatically disable a set of device features of the wireless device as a function of at least the physical position of the wireless device, and a user interface adapted to receive user input from a user of the wireless device, the user input enabling at least one device feature of the set of device features that has been automatically disabled.

According to another broad aspect, there is provided a method in a communications node comprising: receiving status information of a wireless device, the wireless device being one of a plurality of communications devices; maintaining privilege information, the privilege information indicating a subset of the plurality of communications devices that are allowed to access the status information; and allowing access of the status information to the subset of the plurality of communications devices; wherein the status information comprises at least one of an indication of whether the wireless device is able to process communications, an operating state, physical location, and physical speed.

According to another broad aspect, there is provided a communications node comprising a status information function adapted to: receive status information of a wireless device; maintain privilege information, the privilege information indicating a subset of a plurality of communications devices that are allowed to access the status information; and allow access of the status information to the subset of the plurality of communications devices; wherein the status information comprises at least one of an indication of whether the wireless device is able to process communications, an operating state, physical location, and physical speed.

According to another broad aspect, there is provided a method in a communications node comprising: receiving status information of a wireless device; receiving a request to communicate with the wireless device; and automatically processing the request based on the status information; wherein the status information comprises at least one of an indication of whether the wireless device is travelling, an operating state, physical location, and physical speed.

According to another broad aspect, there is provided a communications node comprising a status information function adapted to: receive status information of a wireless device; receive a request to communicate with the wireless device; and automatically process the request based on the status information; wherein the status information comprises at least one of an indication of whether the wireless device is travelling, an operating state, physical location, and physical speed.

According to another broad aspect, there is provided a computer readable medium having computer readable instructions stored thereon for execution on a processor so as to implement any of the methods described above.

Wireless Device & Physical Parameters

Referring now to FIG. 1, shown is a schematic of an example wireless device 10 coupled to a parameter measurement system 19. The wireless device 10 is coupled to the parameter measurement system 19 through coupling 18. The wireless device 10 has a processor 12 coupled to a wireless access radio 11, an operating state function 13, a plurality of device features 14, and a parameter measurement function 15. The wireless device may have other components, but they are not shown for sake of simplicity.

In operation, the wireless device is adapted to operate using many different device features 14. There are many possible device features 14. Device features 14 may for example include telephony, electronic messaging such as email, Internet browsing, etc. Some of the device features 14 may utilise the wireless access radio 11 for communication with a wireless access network (not shown). The operating state function 13 is adapted to determine an operating state for the wireless device and to operate the wireless device 10 in accordance with the operating state thus determined. The operating state function 13 determines the operating state based on a physical speed of the wireless device. The physical speed of the wireless device can be determined using any appropriate method, and particular examples are given below.

An "operating state" of the wireless device generally refers to any state of operation in which the wireless device operates in a certain manner. In one embodiment, each operating state has a respective subset of the device features 14 that are enabled while the remaining device features are disabled. Some device features may be enabled in a first operating state while they are disabled in a second operating state. Furthermore, the wireless device may perform various actions in the first operating state while performing no actions in the second operating state. A change in the wireless device's physical speed may trigger a change in the operating state. There are many possible operating states that can be defined in an implementation specific basis.

In some implementations, the operating states are defined so as to satisfy appropriate operation and/or legal requirements. For example, there may be a requirement for wireless device users to cease using the voice capability of their devices while driving. In such a scenario, if a physical speed of the wireless device is detected that is indicative that the user is driving, the operating state becomes one that has disabled voice capability of the device, thereby preventing the user from using that feature.

There are many mechanisms that can be implemented to allow the wireless device 10 to determine its physical speed. In the illustrated example, the parameter measurement function 15 determines the physical speed of the wireless device in cooperation with an externally located parameter measurement system 19. In some implementations, the parameter measurement system 19 is a position measurement system, capable of determining or participating in the determination of physical position of the wireless device 10. GPS (global positioning system) is an example of a position measurement system. In another implementation, parameter measurement system 19 is integral to wireless device 10, such as an onboard GPS device.

In some implementations, the physical speed of the wireless device 10 is computed based on the physical position. There are many ways that this can be accomplished. In a first example, a difference between two physical position measurements is divided by a time interval between the two measurements.

In some implementations, the operating state is determined based on measurements that reflect both the current speed, and recent speed. In an example of how this might be employed, if a user is driving and stops at an intersection, the instantaneous speed of the vehicle and the wireless device may be zero, but the user is still driving. Therefore, by calculating the physical speed based on past position measurements, the wireless device can determine a non-zero value for the physical speed. This may be implemented for example by computing a moving average for the physical speed. In doing so, abrupt changes in speed do not severely affect the computed physical speed.

In other implementations, the parameter measurement system 19 is implemented as part of an automobile. An automobile may be adapted to communicate the vehicle's physical speed to the wireless device 10. If the user of the wireless device 10 is inside the automobile, then the physical speed of the automobile will be substantially identical to that of the wireless device 10. There are many ways that an automobile may be adapted to communicate the physical speed to the wireless device 10. In a first example, the automobile and the wireless device 10 are BT (BlueTooth) enabled and use BT communication to communicate the physical speed. Other wireless or wired implementations are possible.

The embodiments described use a wireless device's physical speed to determine an operational state for the wireless device. In other embodiments, the physical speed in combination with one or more additional parameters are used to determine the operational state. For example, any other kinematics parameter describing motion such as direction of motion, physical position, physical velocity, physical acceleration, or physical surge may be contemplated. There are many possibilities for representing the kinematics parameters. For example, physical position may be represented using two variables (e.g. x-component, y-component) when representing a geographical position. As another example, physical position may be represented using three variables (e.g. x-component, y-component, z-component) when representing a position in space such as when a measurement of altitude is to be considered. More generally, each kinematics parameter may be represented using one or more appropriate variable.

The wireless device may determine such additional parameters by any appropriate manner. Example implementations for determining physical position in connection with determining physical speed have been described. In another example, the wireless device determines its physical position based on cellular network coverage zones. A cellular network has a plurality of coverage zones, which are position-specific. Therefore, the wireless device may determine its physical position based on its present coverage zone. Physical acceleration and physical surge may be determined based on one or more computed time derivatives of position and/or speed.

In the illustrated example, the components shown may be separate, combined, or partially combined. The coupling of components shown is merely an example and other arrangements are possible. The operating state function 13 and the device features 14 may be separate or combined. In some implementations, the operating state function 13 and the device features 14 are implemented as software for execution on the processor 12. More generally, the operating state function 13 and the device features 14 may be implemented as software, hardware, firmware, or any combination thereof.

Figure 2:
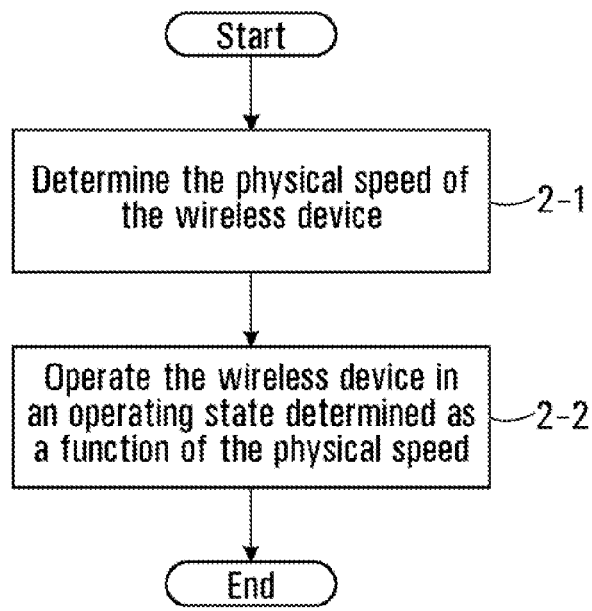
FIG. 2 is a flowchart of an example method of operating a wireless device as a function of the wireless device's physical speed.

Referring now to FIG. 2, shown is a flowchart of an example method of operating a wireless device as a function of the wireless device's physical speed. This method may be implemented on a wireless device, for example by the operating state function 13 of the wireless device 10 shown in FIG. 1. At step 2-1, the wireless device determines the physical speed of the wireless device. As previously discussed with reference to FIG. 1, there are many ways that the wireless device may determine the physical speed. At step 2-2, the wireless device operates in an operating state determined as a function of the physical speed.

Enable/Disable Device Features

Figure 3:
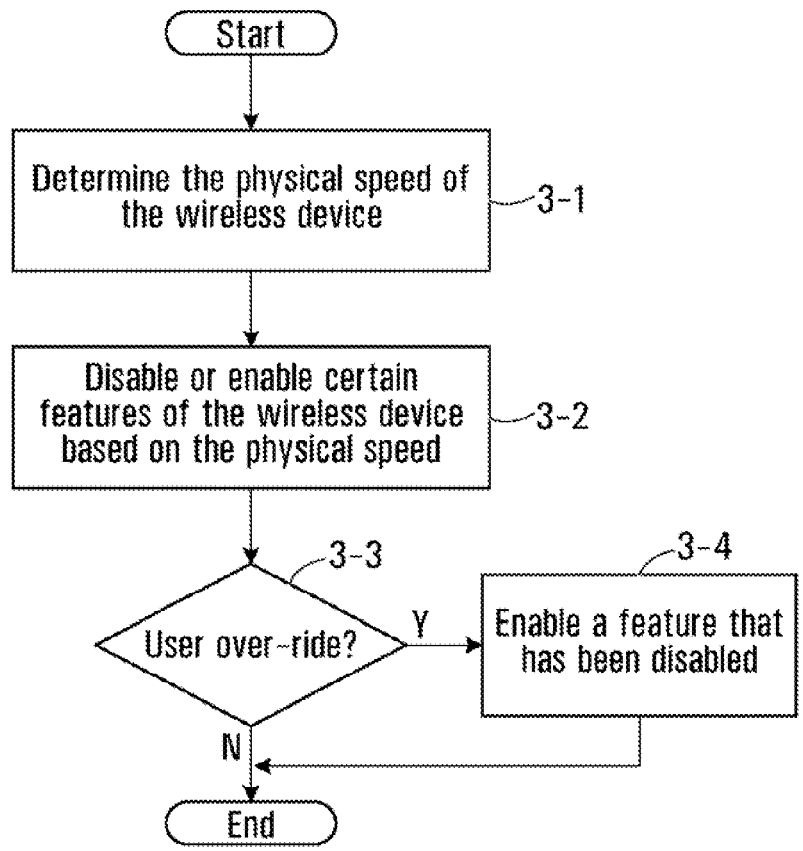
FIG. 3 is a flowchart of an example method of enabling or disabling wireless device features as a function of the wireless device's physical speed.

Referring now to FIG. 3, shown is a flowchart of an example method of enabling or disabling wireless device features as a function of the wireless device's physical speed. This method may be implemented on a wireless device, for example by the operating state function 13 of the wireless device 10 shown in FIG. 1. At step 3-1, the wireless device determines its physical speed. At step 3-2, the wireless device automatically enables or disables certain features of the wireless device based on the physical speed. If at step 3-3 the user of the wireless device over-rides the automatic disabling of device features, then at step 3-4 the wireless device enables a feature that has been disabled.

There are many possible device features that may be disabled. For example, telephony, direct dialing, telephony without a headset, Internet browsing, and electronic messaging may be disabled. Device features may be separately disabled or disabled in combination with other device features. In some implementations, each device features using wireless communication is disabled by disabling communication via the wireless access radio of the wireless device. This may be accomplished for example by turning off the wireless access radio. Other example features that may be disabled or inforced include voice calls without a wired headset, voice calls without a wireless headset, composing emails, reading emails, dialing a phone number using digit dial, dialing a phone number using voice activated dialing, dialing using speed dial, sending or receiving instant messages, typing notes in applications, unlocking a device, and shutting off the wireless access radio. Another example feature that may be disabled or enforced is using a mapping application to follow a route, enter an address, or look up a point of interest.

In the above example, the user is given the opportunity to over-ride the disabling of device features. In an example of where this might prove useful, if the user is a passenger in an automobile and the wireless device automatically disables telephony upon detecting a driving speed, then the user may over-ride the automatic disabling of telephony in the event that the user wants to use the wireless device for telephony. In another example of where this might prove useful, if a user is in a train and the wireless device automatically disables functionality upon detecting a driving speed, then the user may manually override the enacted policy.

In some implementations, the over-ride capability is provided only to users that have previously agreed not to use the over-ride capability when the user is actually driving or should not use the device for some other reason. Preferably, the user is required to sign or agree to a statement to this effect, and this information is stored as part of a user's profile managed by the access network. The wireless device is then configured to allow or disallow user over-rides as a function of the user profile, and more particularly as a function of whether or not the profile indicates the over-ride function is allowed for that user.

In other implementations, the opportunity to over ride the automatic disabling of device features is not provided to the user. In yet other implementations, the user is conditionally provided an opportunity to override the automatic disabling of device features. For example, depending on the physical position and/or physical speed, some device features may be disabled with no opportunity to enable them while other device features may be enabled upon a user-override. For example, a user-override may enable hands free telephony, but not telephony without a hands-free set. Other implementations are possible.

In some implementations, the automatic enabling or disabling of features is executed in accordance with appropriate operation and/or legal requirements. Legal requirements may be geographically dependent. Accordingly, the operation of the wireless device may be geographically dependent. Therefore, in addition to physical speed, the wireless device may determine and consider the physical position of the wireless device so that the physical position may be considered when determining the operating state. For example, if it is illegal to use a wireless device while driving in California and the wireless device determines based on its physical position that it is within California, then the wireless device may automatically disable telephony if the physical speed is greater than 10 km/hr. Other jurisdictions may have different legal requirements. Therefore, a wireless device may operate differently in one jurisdiction than in another.

In the above example, the physical speed and geographical position are used to determine an operational state. In another example, the definition of the operating states as a function of speed can be re-defined on a geographical basis, as the operation and/or legal requirements may differ in different coverage areas. In some implementations, the definition of the operating states is communicated to the wireless device from a communications node upon entering a new geographical region. In some implementations, the communication is in response to a request by the wireless device. In other implementations, the communications node initiates the communication.

In some implementations, within a geographical region, there are specific geographical areas of interest, for example a train track. If a user is a passenger on a train, then the wireless device may determine that it is in the vicinity of a train track based on its physical position and may therefore operate differently than if it were not in the vicinity of the train track. For example, the wireless device may not disable any device features despite determining a non-zero physical speed. In such situations, there may be no need to determine the physical speed of the wireless device.

In some implementations, the wireless device is triggered by other situations to operate differently. For example if the wireless device determines that the user is traveling in an air plane, then the wireless device operates differently than if the user were traveling in an automobile. There are many ways that the mobile device may determine that the user is travelling in an air plane. In some implementations, the mobile device determines that the user is travelling in an air plane if its physical speed is greater than a predefined value, for example 200 kph. In other implementations, the mobile device determines that the user is travelling in an air plane if its physical position indicates an elevation that is greater than a predefined value, for example 10,000 feet. In other implementations, the mobile device determines that the user is travelling in an air plane if its physical speed is greater than a predefined value and its physical position indicates an elevation that is greater than a predefined value.

Informing Other Users

The ability to automatically enable or disable device features as a function of the physical speed has been described. This may for example be used to disable telephony for a user that is driving an automobile. However, this may render the user un responsive to communications by others who do not understand that communication is inappropriate or impossible. Accordingly, in some embodiments, the wireless device informs other users that communication is inappropriate or impossible.

Figure 4:
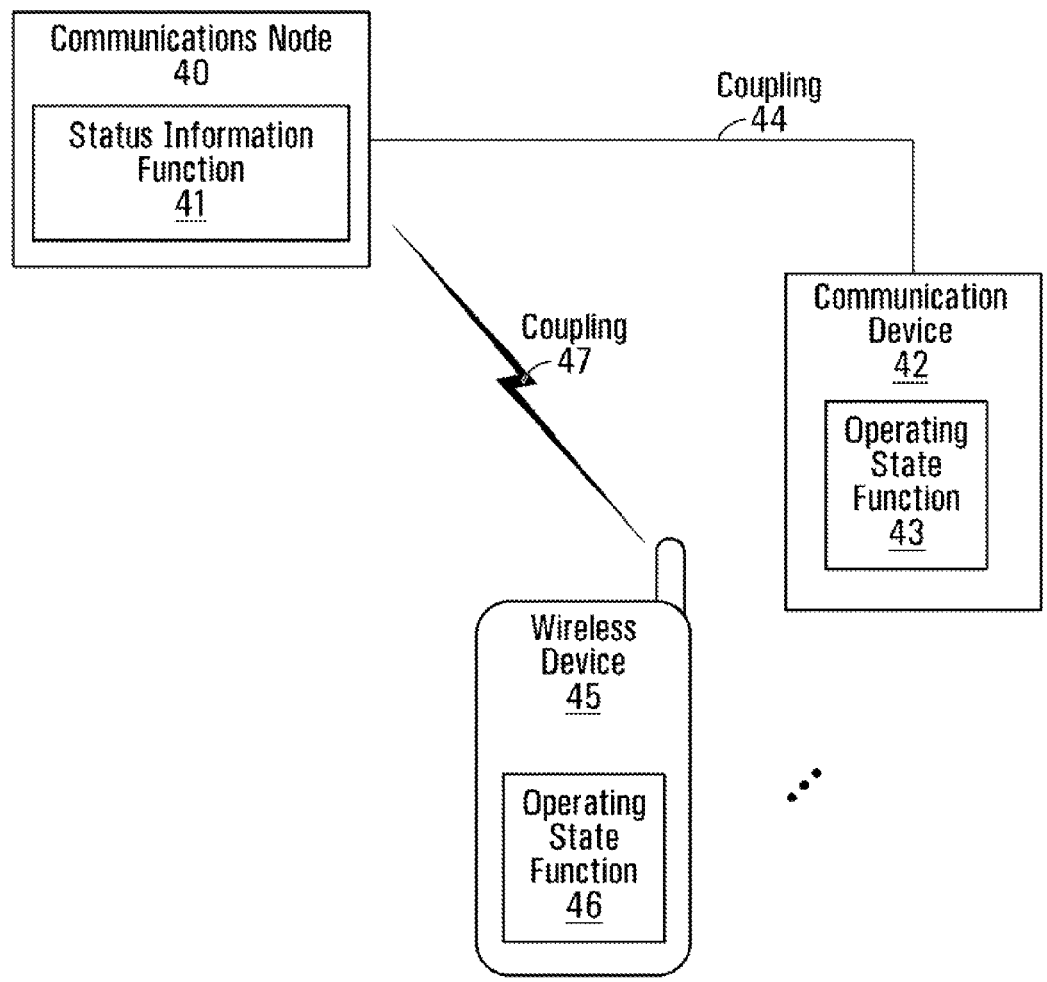
FIG. 4 is a schematic of a network in which a set of communications devices are coupled to a communications node.

Referring now to FIG. 4, shown is a schematic of a network in which a set of communications devices 42, 45 is coupled to a communications node 40 by respective couplings 44,47. The set of communications devices includes a communications device 42 and a wireless device 45 and may include other communications devices, but they are not shown for sake of simplicity. The communications device 42 may be any appropriate communications device, such as a wireless device or a wired device. Each communications device 42,45 preferably has a respective operating state function 43,46. The communications node 40 has a status information function 41. The network may have other components, but they are not shown for sake of simplicity.

In operation, each communications device 42,45 is preferably adapted to communicate status information to the communications node 40 via the respective couplings 44,47. The status information function 41 maintains the status information for the communications devices 42,45 in some implementations, the status information function 41 makes the status information of a given communications device (e.g. wireless device 45) available to another communications device (e.g. communications device 42). In some implementations, a communications device is allowed access to another communications device's status information only if there is permission to do so. Further details of accessing another communications device's status information are provided with reference to FIG. 6. In other implementations, the status information function 41 processes requests for communication based on the status information. Further details of processing requests for communication are provided with reference to FIG. 7.

There are many possibilities for the status information. In some implementations, the status information includes the physical position and/or physical speed of the wireless device. In some implementations, the status information includes an indication that the wireless device is not able to process communications. In some implementations, the status information includes an indication of the operating state of the wireless device. For example, in some implementations, the status information indicates that the user is "driving" when it has been determined that the user is driving. In some implementations, the status information includes an indication that the wireless device is travelling. Other implementations are possible.

There are many possibilities for the communications node 40. In some implementations, the communications node 40 is a relay. In other implementations, the communications node 40 is a server. A "communications node" in the context of this application generally refers to any node in communication with one or more wireless devices.

It is to be understood that the illustrated example is merely an example and that other components or arrangements are possible to that shown. Other wireless devices may be present. The couplings 44,47 may be via a wireless access network (not shown). The operating state functions 43,46 and the status information function 41 may each be implemented as software, hardware, firmware, or any communication thereof.

Figure 5:
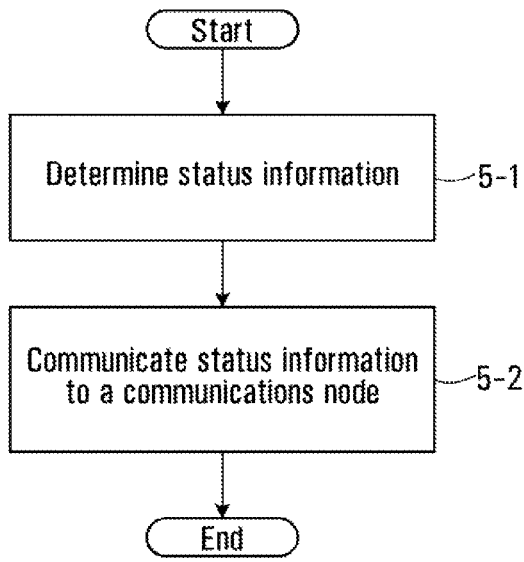
FIG. 5 is a flowchart of an example method of communicating status information to a communications node.

Referring now to FIG. 5, shown is an example method of communicating status information to a communications node. This method may be implemented on a wireless device, for example by the operating state function 43 of the wireless device 45 shown in FIG. 4. At step 5-1 the wireless device determines the status information. At step 5-2 the wireless device communicates the status information to the communications node.

There are many ways in which the wireless device may communicate the status information. In a first implementation, the wireless device communicates the status information periodically. This may occur for example whenever the status information is determined. In a second implementation, the wireless device communicates the status information in response to a request by the communications node for the status information. In a third implementation, the wireless device communicates the status information upon a change in its operating state. In a fourth implementation, combinations of the first three implementations are employed. Other implementations are possible.

In some implementations, the status information is associated with permissions that identify users that may access the status information. In some implementations, the wireless device determines which users have access to the status information and communicates this information to the communications node.

There are many ways that the permission information may be communicated. In some implementations, the permission information is communicated upon a user update to the permissions. In a second implementation, the permission information is communicated along with the status information. In a third implementation, the permission information is communicated whenever the user updates the permission information or whenever the status formation is communicated. Other implementations are possible.

Figure 6:
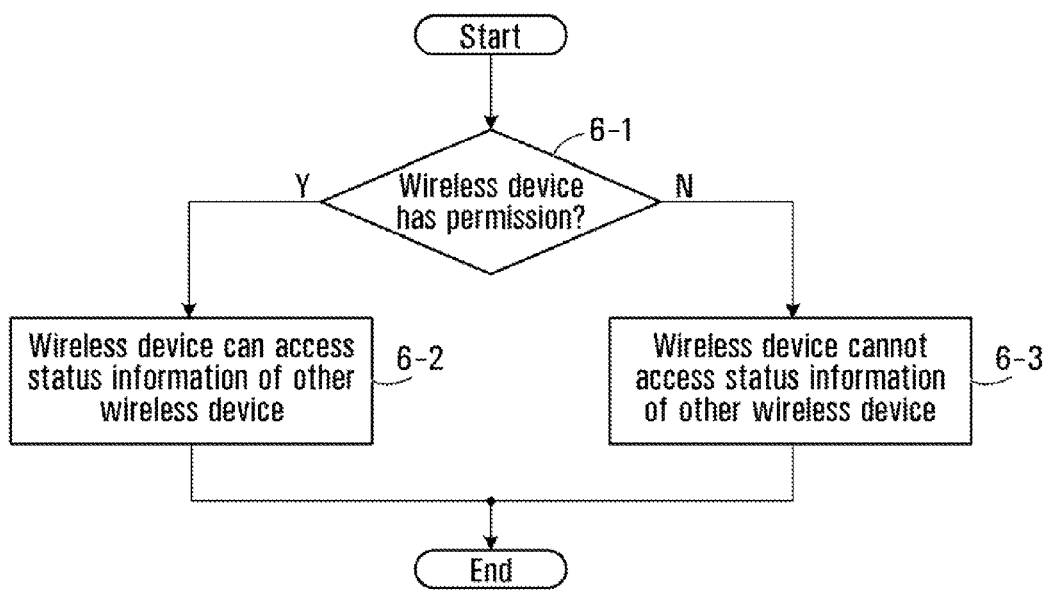
FIG. 6 is a flowchart of an example method of accessing the status information based on the permission information.

Referring now to FIG. 6, shown is an example method of accessing the status information based on the permission information. This method may be implemented on a communications node, for example by the status information function 41 of the communications node 40 shown in FIG. 4. At step 6-1, the communications node determines whether a wireless device has permission to access the status information of another wireless device based on the permission information. If the wireless device has permission, then at step 6-2 the wireless device may access the status information of the another wireless device. The user of the wireless device may decide whether to call the user of the another wireless device based on the status information. However, if the wireless device does not have permission, then at step 6-3 the wireless device cannot access the status information of the another wireless device.

Figure 7:
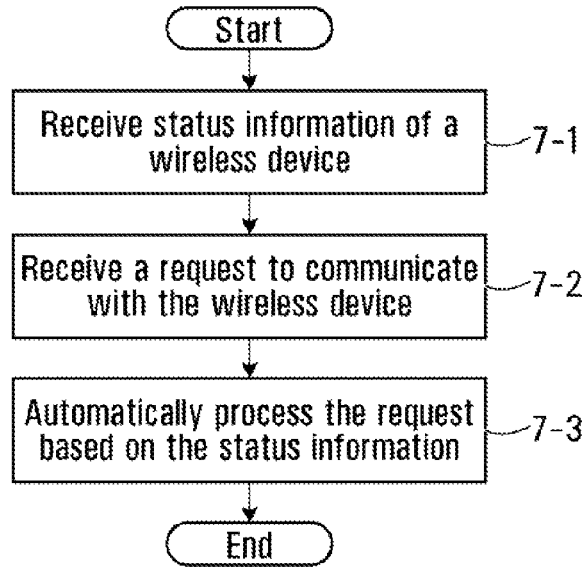
FIG. 7 is a flowchart of an example method of automatically processing a request based on the status information.

Referring now to FIG. 7, shown is a flowchart of an example method of automatically processing a request based on the status information. This method may be implemented on a communications node, for example by the status information function 41 of the communications node 40 shown in FIG. 4. At step 7-1, the communications node receives status information of a wireless device. At step 7-2, the communications node receives a request from a communications device, to communicate with the wireless device. At step 7-3, the communications node automatically processes the request based on the status information.

There are many ways for the communications node to automatically process the request from the communications device based on the status information. For example, in some implementations, if the communications device transmits an electronic message such as an email message to the wireless device while the user of the wireless device is driving, then an auto reply message indicating that the user is unavailable is generated and transmitted to the communications device. The auto reply message could for example state "I'm sorry but I'm unavailable to respond to your message at the moment. I'll get back to you as soon as possible." In specific implementations, the auto reply message is generated and transmitted only if the electronic message that was received is marked as "urgent". As another example, in some implementations, if the communications device calls the wireless device while the user of the wireless device is driving, then the call is automatically routed to a voice mail with a recording indicating that the user is unavailable.

In the illustrated example, the communications node provides the status information of the wireless device to the communications device that is requesting communications. The wireless device may be unaware that the communications device is requesting communications. In other implementations, the wireless device determines if and how the status information is to be provided to the communications device. More generally, at least one of the wireless device and the communications node determines if and how the status information is to be provided to the communications device.

In some implementations, there is provided configuration information, such as an IT policy, for defining how to react upon another communications device requesting communications. For example, the configuration information can specify auto reply electronic messages and/or automatic routing to voice mail when it is determined that the user is driving. In some implementations, the configuration information is configurable by the user. This could for example allow the user to configure auto replies and under what circumstances the auto replies are generated and transmitted. Other implementations are possible.

In some implementations, the user of the wireless device can select a "Driving Mode". This allows the user to specify that they are driving in the event that the wireless device is not able to make this determination, for example if the wireless device is not GPS-enabled. This also allows the user to achieve the functionality described above for indicating that they are unavailable for communications, irrespective of whether the user is actually driving.

Instructing the Communications Node

The ability to inform others that communication is inappropriate or impossible has been described. However, this may riot stop people from attempting to communicate with the user. For example, those that are unable to access the status information of the wireless device may have no idea whether the user of the wireless device is able to use the wireless device and therefore may attempt to communicate with the user. Accordingly, in some implementations, the communication node, is adapted to process communications directed to the wireless device in a manner that takes into account the operational state of the wireless device.

Figure 8:
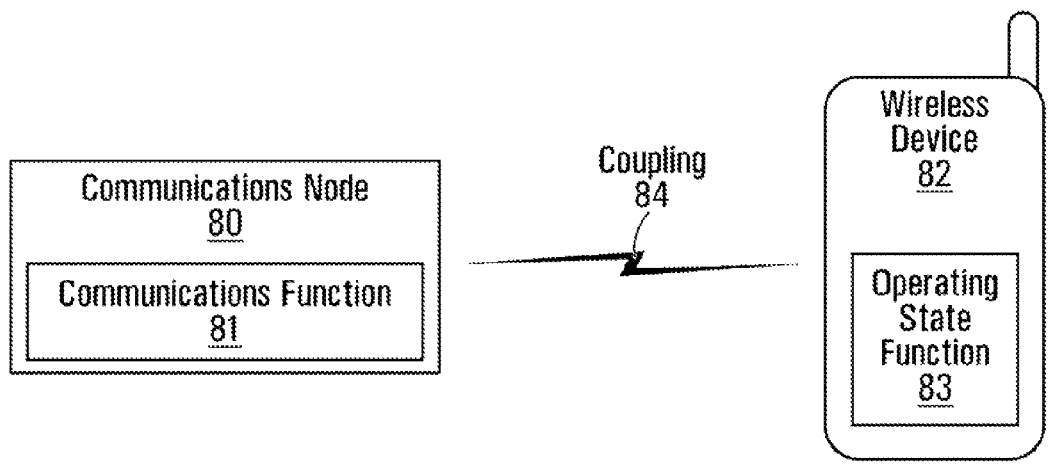
FIG. 8 is a schematic of an example wireless device coupled to an example communications node.

Referring now to FIG. 8, shown is a schematic of an example wireless device coupled to an example communications node. The wireless device 82 has an operating state function 83 and is coupled via coupling 84 to the communications node 80, which has a communications function 81.

In operation, the operating state function 32 of the wireless device 82 is adapted to instruct the communications node 80 how to process communications directed at the wireless device 82. In response, the communications function 81 of the communications node 80 is adapted to process communications directed to the wireless device 82 in accordance with the instructions.

There are many kinds of communication that may be directed to the wireless device 82. Accordingly, processing of the communication may be specific to the type of communication. As a first example, a communication that can be directed to the wireless device 82 is a data message such as an electronic message. In this example, processing the communication may include storing the data message until it can be transmitted to the wireless device. In a second example, the communication is a voice call. In this example, processing the communication may include routing the voice call to a message answering service.

Alternatively, the network, having determined or been made aware of the operating state of a given wireless device, can determine how to process communications directed to the wireless device while in that operating state.

It is to be understood that the illustrated example is merely an example and that other components or arrangements are possible to that shown. Other wireless devices may be present. The coupling 84 may be via a wireless access network (not shown). The operating state function 83 and the communications function 81 may each be implemented as software, hardware, firmware, or any combination thereof.

Figure 9:
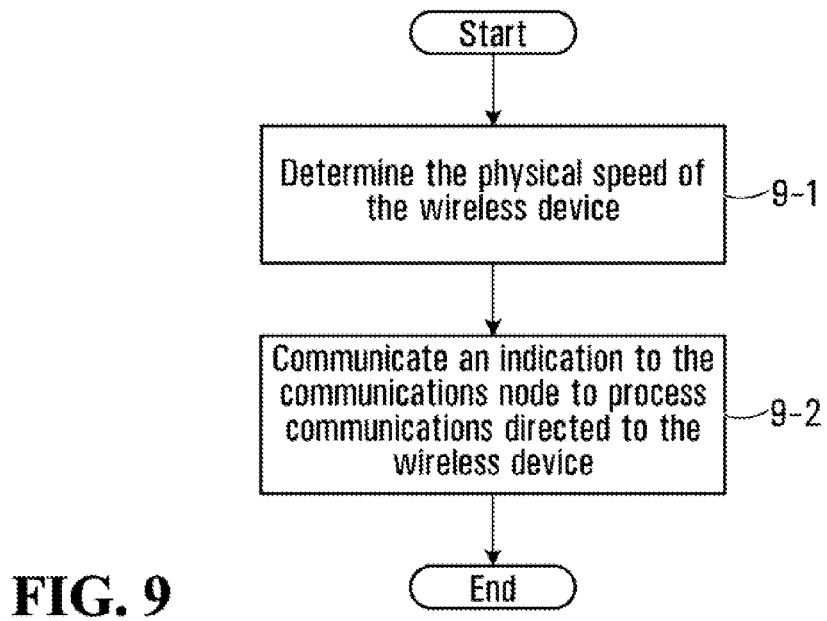
FIG. 9 is a flowchart of an example method of instructing the communications node to process communications.

Referring now to FIG. 9, shown is a flowchart of an example method of instructing the communications node to process communications. This method may be implemented on a wireless device for example by the operating state function 83 of the wireless device 82 shown in FIG. 8. At step 9-1 the wireless device determines the physical speed of the wireless device. At step 9-2, the wireless device communicates an indication to the communications node to process communications at least until the operating state has changed.

There are many situations in which the operating state may change. For example, it a user was driving an automobile, but has since then parked the automobile, then the wireless device determines that the user is no longer driving and the operating state changes accordingly. In some implementations, the wireless device informs the communications node to stop processing or holding communications. Other implementations are possible.

Figure 10:
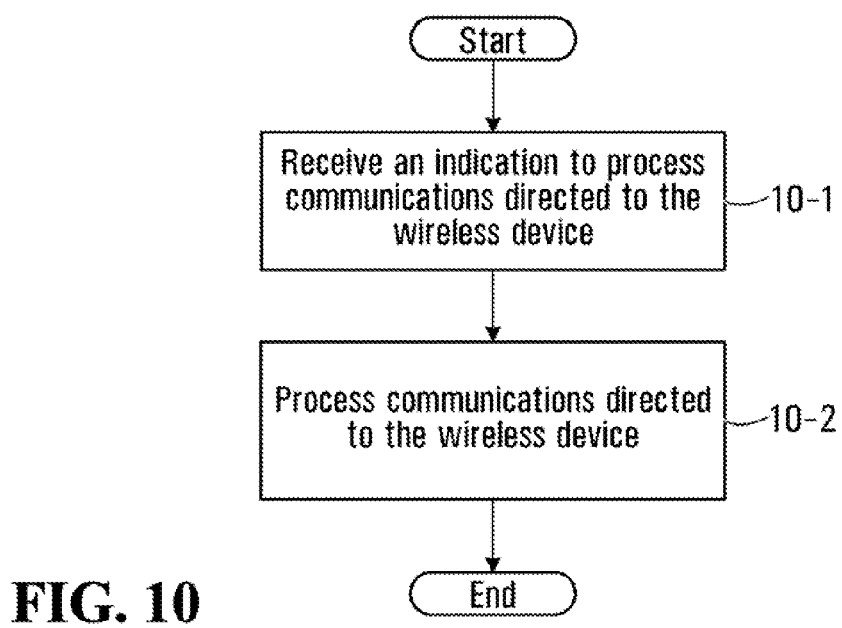
FIG. 10 is a flowchart of an example method of processing communications in the communications node.

Referring now to FIG. 10, shown is a flowchart of an example method of processing communications in the communications node. This method may be implemented on a communications node, for example by the communications function 81 of the communications node 80 shown in FIG. 8. At step 10-1, the communications node receives an indication that communications directed to the wireless device are to be processed. At step 10-2, the communications node processes communications directed to the wireless device at least until another indication is received indicating that the operating state of the wireless device has changed. As discussed above, there are many situations in which the operating state may change.

Entities Determining Operating State

Figure 11:
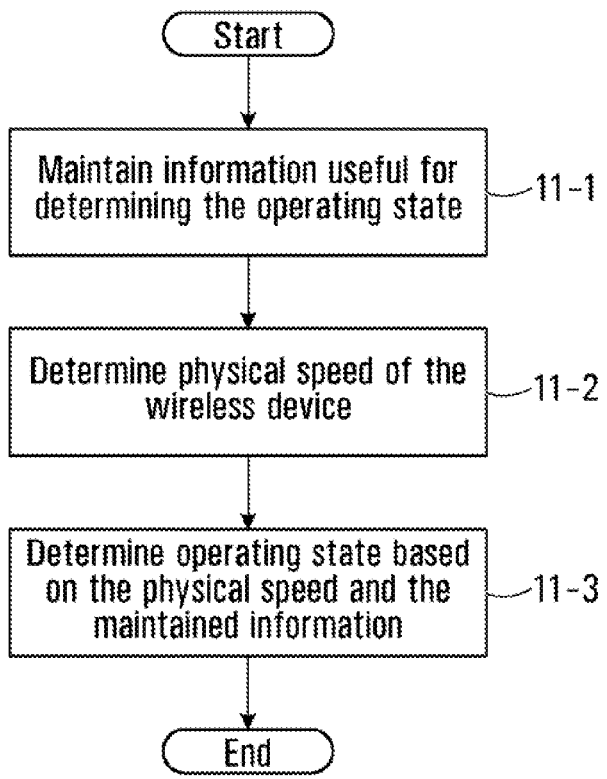
FIG. 11 is a flowchart of an example method of determining an operating state based on the wireless device's physical speed.

In some implementations, a wireless device is adapted to determine its own operating state. Referring now to FIG. 11, shown is an example method of determining an operating state based on the wireless device's physical speed. This method may be implemented on a wireless device, for example by the operating state function 13 of the wireless device 10 shown in FIG. 1. At step 11-1, the wireless device maintains information useful for determining its operating state. At step 11-2, the wireless device determines its physical speed. At step 11-3, the wireless device determines its operating state based on its physical speed and the maintained information.

There are many ways that the wireless device can maintain information useful for determining its operating state. In some implementations, the wireless device maintains information in a data structure. In some implementations, the data structure is a database. In some implementations, the data structure can be provided with updates. As a first example, if the legal requirements in a certain jurisdiction change, then the data structure may be updated to reflect those changes. As a second example, if the wireless device travels to a new jurisdiction, then the data structure may be updated to reflect the new jurisdiction. In some implementations, the communications node provides updates to the data structure.

Figure 12:
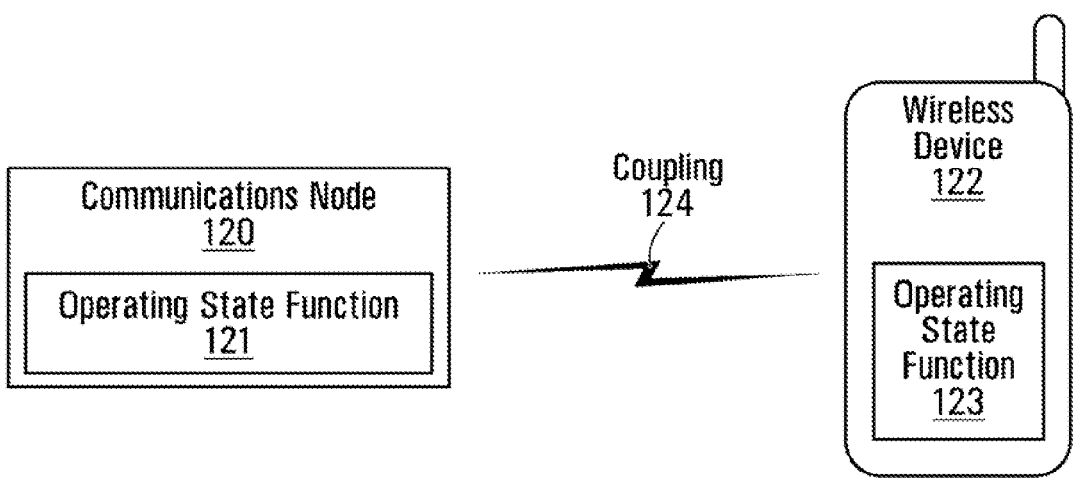
FIG. 12 is a schematic of an example wireless device coupled to an example communications node.

In other implementations, a communications node is adapted to determine operating states for wireless devices. Referring now to FIG. 12, shown is an example wireless device 122 coupled to an example communications node 120. The wireless device 122 has an operating state function 123 and is coupled via coupling 124 to the communications node 120, which has an operating state function 121.

In operation, the operating state function 123 of the wireless device 122 is adapted to communicate its physical speed to the communications node 120 so that the communications node 120 may determine an operating state for the wireless device 122 based on the physical speed. The operating state function 123 operates the wireless device 122 in accordance with the operating state.

It is to be understood that the illustrated example is merely an example and that other components or arrangements are possible to that shown. Other wireless devices may be present. The coupling 124 may be via a wireless access network (not shown). The operating state function 121 and the operating state function 123 may each be implemented as software, hardware, firmware, or any combination thereof.

Figure 13:
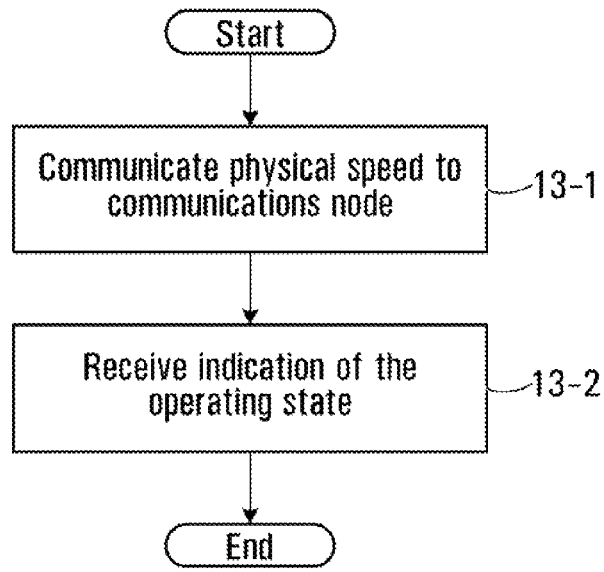
FIG. 13 is a flowchart of an example method of communicating an indication of physical speed to a communications node so that the communications node may determine the operating state of the wireless device.

Referring now to FIG. 13, shown is a flowchart of an example method of communicating an indication of physical speed to a communications node so that the communications node may determine the operating state of the wireless device. This method may be implemented on a wireless device, for example by the operating state function 123 of the wireless device 122 shown in FIG. 12. At step 13-1, the wireless device communicates an indication of physical speed to the communications node. At step 13-2, the wireless device receives an indication of the operating state.

In the above example, the wireless device receives an indication of the operating state. In this case, the wireless device may operate according to the indicated operating state received by the communications node. However, in a second implementation, the communications node does not communicate the operating state to the wireless device and the communications node operates with the wireless device in accordance with the operating state. Examples of how the communications node may accomplish this are provided below with reference to FIG. 14.

Figure 14:
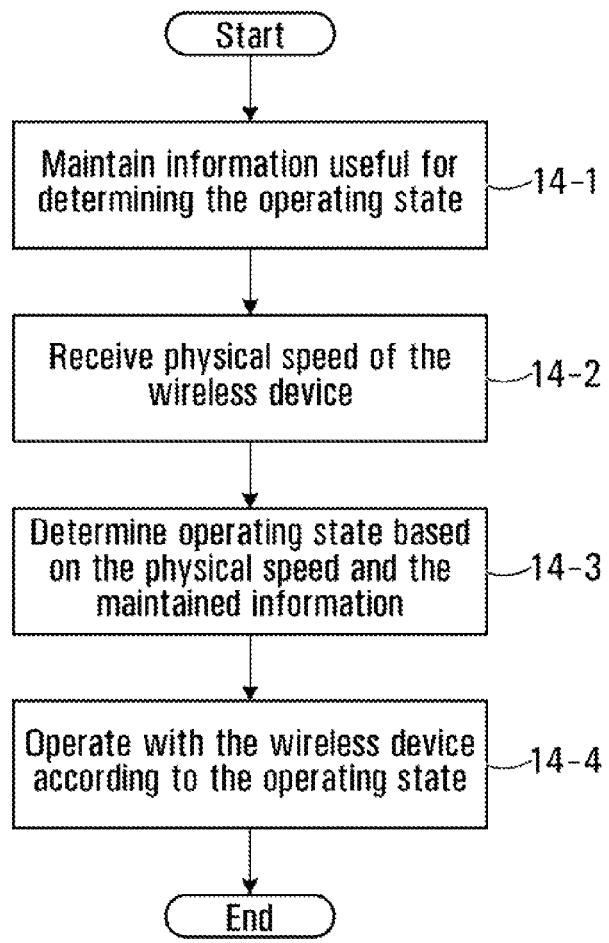
FIG. 14 is a flowchart of an example method of determining the operating state based on the physical speed of the wireless device.

Referring now to FIG. 14, shown is a flowchart of an example method of determining the operating state based on the physical speed of the wireless device. This method may be implemented on a communications node, for example by the operating state function 121 of the communications node 120 shown in FIG. 12. At step 14-1, the communications node maintains information useful for determining the operating state of the wireless device. At step 14-2, the communications node receives an indication of the physical speed of the wireless device. At step 14-3, the communications node determines the operating state of the wireless device based on the physical speed and the maintained information. At step 14-4, the communications node operates with the wireless device in accordance with the operating state.

There are many ways that the communications node may operate with the wireless device in accordance with the operating state. In some implementations, based on the operating state, the communications node processes communications directed to the wireless device. Examples of how this may be accomplished have been provided above. In some implementations, based on the operating state, the communications node disables communications from the wireless device. Other implementations are possible.

Numerous modifications and variations of the present application are possible in light of the above teachings. It is therefore to be understood that within the scope of the appended claims, the application may be practised otherwise than as specifically described herein.

We claim:

1. A method allowing a wireless device to operate according to an operating state, the method being executed in the wireless device or in a communications node coupled to the wireless device, the method comprising:
   maintaining geographic-specific information useful for determining the operating state of the wireless device based on both a physical speed and a physical position of the wireless device;
   determining both the physical speed and the physical position of the wireless device;
   determining the operating state of a plurality of possible operating states based on both the physical speed and the physical position of the wireless device, in accordance with the geographic-specific information; and
   allowing the wireless device to operate according to the operating state;
   wherein for at least some of the possible operating states, a respective set of device features is disabled, the method further comprising:
   communicating status information indicative of whether the wireless device is able to process communications;
   wherein the status information is associated with permissions so as to allow a set of users to access the status information while disallowing all other users from accessing the status information.

2. The method of claim 1 wherein the method is executed by the communications node, the method further comprising:
   communicating the operating state to the wireless device.

3. The method of claim 1 further comprising:
   receiving information from a position measurement system, the information being used to determine both the physical speed and the physical position of the wireless device.

4. The method of claim 3 wherein the position measurement system is a GPS (global positioning system).

5. The method of claim 1 further comprising:
   receiving user input for enabling a certain feature that would otherwise be disabled based on the physical speed; and
   enabling the certain feature in response to the user input.

6. The method of claim 1, further comprising:
   receiving information from an automobile inside of which is the wireless device, the information being used to determine the physical speed of the wireless device.

7. The method of claim 1, wherein the respective set of device features comprises at least one feature that would require attention by a user of the wireless device if the at least one feature were not disabled.

8. The method of claim 1, wherein the respective set of device features comprises at least one of telephony, direct dialling, telephony without a headset, Internet browsing, electronic messaging, voice call without a wired headset, voice call without a wireless headset, composing emails, reading emails, dialling a phone number using digit dial, dialling a phone number using voice activated dialling, dialing using speed dial, sending or receiving instant messages, typing notes in applications, using a mapping application, and unlocking a device.

9. The method of claim 1, wherein the status information comprises at least one of the operating state, the physical position, and the physical speed.

10. The method of claim 1, wherein determining the physical speed comprises:
    acquiring two position measurements; and
    computing the physical speed of the wireless device as the difference between the two position measurements divided by a time interval between the two position measurements.

11. The method of claim 1, wherein the method is executed by the wireless device.

12. The method of claim 11, further comprising:
    communicating to the communications node an indication to process communications directed at the wireless device at least until the operating state is changed.

13. The method of claim 1, wherein the method is executed by the communications node, the method further comprising:
    allowing access to the status information in accordance with the permission information.

14. The method of claim 1, wherein the method is executed by the communications node, the method further comprising any one of:
    processing communications directed to the wireless device in accordance with the operating state of the wireless device; and
    disabling communications from the wireless device in accordance with the operating state of the wireless device.

15. A non-transitory computer readable medium having computer readable instructions stored thereon for execution on a processor so as to implement the method of claim 1.

16. A wireless device comprising:
    a wireless access radio configured to communicate with a wireless network;
    an operating state function configured to maintain geographic-specific information relating to the physical position of the wireless device; and
    a parameter measurement function configured to determine both the physical speed and the physical position of the wireless device;
    wherein the operating state function is further configured to:

determine the operating state of a plurality of possible operating states based on the physical speed, the physical position, and the geographic-specific information; and allow the wireless device to operate according to the operating state, such that operation of the wireless device varies depending on the physical speed, the physical position and the geographic specific information;

wherein for at least some of the possible operating states, a respective set of device features is disabled;

wherein the operating state function is further configured to communicate status information indicative of whether the wireless device is able to process communications;

wherein the status information is associated with permissions so as to allow a set of users to access the status information while disallowing all other users from accessing the status information.

17. A communications node comprising:
an operating state function configured to:
 maintain geographic-specific information relating to the physical position of the wireless device;
 determine both the physical speed and the physical position of the wireless device;
 determine the operating state of a plurality of possible operating states based on the physical speed, the physical position, and the geographic-specific information; and
 allow the wireless device to operate according to the operating state, such that operation of the wireless device varies depending on the physical speed, the physical position and the geographic specific information;

wherein for at least some of the possible operating states, a respective set of device features is disabled;

wherein the operating state function is further configured to communicate status information indicative of whether the wireless device is able to process communications;

wherein the status information is associated with permissions so as to allow a set of users to access the status information while disallowing all other users from accessing the status information.

18. The communications node of claim 17 wherein the operating state function is further configured to perform at least one of:
 communicate the operating state to the wireless device, the wireless device controlling operation of the wireless device in accordance with the operating state;
 process communications directed to the wireless device in accordance with the operating state of the wireless device; and
 disable communications from the wireless device in accordance with the operating state of the wireless device.

* * * * *